United States Patent
Tille et al.

(10) Patent No.: US 11,137,587 B2
(45) Date of Patent: Oct. 5, 2021

(54) LIGHT SHEET MICROSCOPE AND MICROSCOPIC METHOD USING A LIGHT SHEET MICROSCOPE

(71) Applicant: Leica Microsystems CMS GmbH, Wetzlar (DE)

(72) Inventors: Sebastian Tille, Marburg (DE); Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 16/305,395

(22) PCT Filed: Jun. 2, 2017

(86) PCT No.: PCT/EP2017/063576
§ 371 (c)(1),
(2) Date: Nov. 29, 2018

(87) PCT Pub. No.: WO2017/207807
PCT Pub. Date: Dec. 7, 2017

(65) Prior Publication Data
US 2020/0004002 A1    Jan. 2, 2020

(30) Foreign Application Priority Data
Jun. 3, 2016    (DE) .................. 10 2016 110 354.3

(51) Int. Cl.
G02B 21/18    (2006.01)
G02B 21/00    (2006.01)
G02B 21/36    (2006.01)

(52) U.S. Cl.
CPC ....... *G02B 21/0032* (2013.01); *G02B 21/006* (2013.01); *G02B 21/008* (2013.01); *G02B 21/18* (2013.01); *G02B 21/367* (2013.01)

(58) Field of Classification Search
None
See application file for complete search history.

(56) References Cited

U.S. PATENT DOCUMENTS 8,582,203 B2    11/2013    Dunsby
8,619,237 B2    12/2013    Hillman et al.
(Continued)

FOREIGN PATENT DOCUMENTS

DE    102012218920 A1    4/2014
EP    2369401 A1    9/2011
(Continued)

OTHER PUBLICATIONS

Swoger J et al: "Multi-view image fusion improves resolution in three-dimensional microscopy", Optics Express, OSA Publishing, US, vol. 15, No. 13, Jun. 13, 2007 (Jun. 13, 2007), pp. 8029-8042, XP002508396.

*Primary Examiner* — Samuel D Fereja
(74) *Attorney, Agent, or Firm* — Leydig, Voit & Mayer, Ltd.

(57) ABSTRACT

A light sheet microscope includes a specimen-side objective having an illumination device configured to provide a first illumination beam which is focused for forming a first light sheet for illuminating a specimen from a first direction, the first light sheet being inclined obliquely in relation to an optical axis of the objective and being guided through the objective. A detector is configured to detect light passing through the objective. The illumination device is further configured to provide at least one second illumination beam which is focused for forming at least one second light sheet for illuminating the specimen from at least one second direction that differs from the first direction, the at least one second light sheet being inclined obliquely in relation to the optical axis of the objective and being guided through the objective.

20 Claims, 11 Drawing Sheets (56) References Cited

U.S. PATENT DOCUMENTS

| | | | |
|---|---|---|---|
| 2008/0068710 A1 | 3/2008 | Wolleschensky | |
| 2012/0229791 A1* | 9/2012 | Lippert | G02B 21/0064 356/23 |
| 2013/0335818 A1* | 12/2013 | Knebel | G02B 21/06 359/385 |
| 2015/0260978 A1* | 9/2015 | Cremer | G02B 21/06 348/79 |
| 2018/0149854 A1* | 5/2018 | Siebenmorgen | G02B 21/245 |

FOREIGN PATENT DOCUMENTS

| | | |
|---|---|---|
| WO | WO 2015109323 A2 | 7/2015 |
| WO | WO 2015/148560 A1 | 10/2015 |

* cited by examiner

LIGHT SHEET MICROSCOPE AND MICROSCOPIC METHOD USING A LIGHT SHEET MICROSCOPE

CROSS-REFERENCE TO PRIOR APPLICATIONS

This application is a U.S. National Stage Application under 35 U.S.C. § 371 of International Application No. PCT/EP2017/063576 filed on Jun. 2, 2017, and claims benefit to German Patent Application No. DE 10 2016 110 354.3 filed on Jun. 3, 2016. The International Application was published in German on Dec. 7, 2017, as WO 2017/207807 A1 under PCT Article 21(2)

FIELD

The invention relates to a light sheet microscope with a specimen-side objective, with an illumination device for providing a first illumination beam which is focused for forming a first light sheet for illuminating a sample from a first direction, said light sheet being inclined obliquely in relation to an optical axis of the objective and being guided through the objective, and having a detection device for detection light passing through the objective.

The invention further relates to a microscopic method with a light sheet microscope, wherein a first illumination beam is provided by means of an illumination device which is focused for forming a first light sheet for illuminating a specimen from a first direction, said light sheet being inclined obliquely in relation to an optical axis of a specimen-side objective and being guided through the objective, and wherein detection light passing through the objective is detected by a detection device.

BACKGROUND

Light sheet microscopes and microscopic methods with such light sheet microscopes are known in practice and exist in different embodiments. For example, light sheet microscopes for illuminating a specimen with a light sheet tilted obliquely against an optical axis are known from U.S. Pat. No. 8,619,237 B2, WO 2015/109323 A2 and U.S. Pat. No. 8,582,203 B2. According to this prior art, for example, in the OPM/SCAPE (Oblique Plane Microscopy/Swept Confocally-Aligned Planar Excitation) microscopy, a specimen is always illuminated from a fixed side or from one direction and detected approximately perpendicular thereto. The ability to merge and deconvolute images taken from multiple directions is therefore not possible without rotating the object or specimen. This prevents a simple, proven and established way to generate image data with isotropic resolution. It would be complicated, costly and expensive to incorporate into the system the ability to illuminate the specimen from multiple directions, for example by a rotation of the optical path. It would then be necessary to rotate an alignment unit including a camera and possibly other components in a particularly complex manner.

The illumination and viewing of a specimen from two or more directions was further achieved by rotating the specimen in the area of SPIM microscopy (Single Plane Illumination Microscopy).

In the light sheet microscope according to WO 2015/109323 A2, for example, fluorophores are excited by an illumination beam which is guided over a specimen-side objective and tilted with respect to the optical axis of the objective. The light emanating from the light sheet is picked up by the same specimen-side objective. Via telecentric optics and a second objective, an image is generated by this light, which image is tilted in the same way with respect to the optical axis of the second objective. This so-called "aerial image" may be imaged by a further optics, typically a third objective and a tubular lens, on a sensor, wherein the optical axis or the optical path of the optical system and the sensor is tilted so that the optics is directed perpendicular to the aerial image and the aerial image lies in the focal plane of the optics, for example that of the third objective.

SUMMARY

In an embodiment, the present invention provides a light sheet microscope including a specimen-side objective having an illumination device configured to provide a first illumination beam which is focused for forming a first light sheet for illuminating a specimen from a first direction, the first light sheet being inclined obliquely in relation to an optical axis of the objective and being guided through the objective. A detector is configured to detect light passing through the objective. The illumination device is further configured to provide at least one second illumination beam which is focused for forming at least one second light sheet for illuminating the specimen from at least one second direction that differs from the first direction, the at least one second light sheet being inclined obliquely in relation to the optical axis of the objective and being guided through the objective.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide and develop a light sheet microscope and a microscopic method with a light sheet microscope of said type in such a way that high-resolution images of a specimen may be realized with structurally simple means.

According to an embodiment, the light sheet microscope is designed and further developed such that the illumination device is further configured to provide at least one second illumination beam, which is focused for forming at least one second light sheet for illuminating the specimen from at least one second direction that differs from the first direction, said at least one second light sheet being inclined obliquely in relation to the optical axis of the objective and being guided through the objective.

According to an embodiment, the method is designed and developed in such a way that at least one second illumination beam is provided by the illumination device, which beam is focused for forming at least one second light sheet for illuminating the specimen from at least one second direction that differs from the first direction, said at least one second light sheet being inclined obliquely in relation to the optical axis of the objective and being guided through the objective.

According to embodiments of the invention, it has firstly been recognized that the high-resolution images of a specimen can be achieved in a surprisingly simple manner by skillfully implementing the beam guidance in the light sheet microscope and by skillfully designing the illumination device. In a further inventive manner, it has been specifically recognized for this purpose that the additional design of the illumination device for providing at least one second illumination beam may enable a reliable additional illumination of the specimen from at least one further direction. In this case, the at least one second illumination beam is focused in a further concrete manner to form at least one second light sheet inclined obliquely to the optical axis of the objective and guided through the objective for illuminating the specimen from at least one second direction which differs from the first direction. As a result, the specimen is illuminated from two directions, with the illumination of the specimen in each case being performed with a light sheet, wherein the specimen does not have to be moved, for example, to capture three-dimensional image stacks from the at least two directions. The images may then be evaluated in a post-processing step in order to obtain an image stack with approximately isotropic resolution.

Consequently, the light sheet microscope and the method according to embodiments of the invention provide a light sheet microscope and a method according to which high-resolution images of a specimen may be provided with structurally simple means, in particular without the need for movement of a specimen.

In a specific embodiment of a light sheet microscope and a microscopic method, for example, a second illumination and detection optical path may be integrated into an existing optical system such that the illumination and the detection direction are respectively swapped. In other words, the illumination optical path of the first illumination beam corresponds to the detection optical path of the second illumination beam and vice versa.

The specimen-side objective of the light sheet microscope is an objective which serves both to illuminate the specimen with at least two illumination beams and to detect the detection light generated by these illumination beams, for example excited fluorescent light.

In a specific embodiment of the light sheet microscope, for example in the case of two illumination beams, the first direction and the second direction of at least two illumination beams may be perpendicular to one another or approximately perpendicular to one another. In principle, the illumination beams may be directed into the peripheral area of the pupil or the rear focal plane of the specimen-side objective in order to ensure the required lateral oblique illumination of the specimen. If the aperture of the specimen-side objective is insufficient to radiate the illumination beams into the specimen volume at an angle of 90°, the first direction and the second direction may not be perpendicular to each other but may be at a smaller angle to each other.

With regard to particularly reliable detection of a detection light, the detection device may comprise a first sensor for a first detection light caused by the first illumination beam and passing along a first detection optical path in the objective and at least one second sensor for at least one second detection light caused by the at least one second illumination beam and passing along at least one second detection optical path in the objective. To that extent, a separate sensor may be provided for each detection light caused by a respective illumination beam, in order to then detect precisely the detection light which runs along its individual detection optical path. In this case, the optical paths may be suitable and/or configured for aligning image planes oblique to an optical axis. By realizing such multiple sensors for a plurality of detection lights, a particularly individual operation is possible, as required, since it is possible to select which illumination beams are to be generated and processed. This ensures a particularly high degree of flexibility when using the light sheet microscope.

In one specific exemplary embodiment, the illumination device may be designed to simultaneously provide the first illumination beam and the at least one second illumination beam or to provide the first illumination beam and the at least one second illumination beam at different times, preferably alternately or in a predeterminable sequence.

Alternatively or additionally, the detection device or the sensors of the detection device is or are configured for simultaneous detection of the first detection light and the at least one second detection light or for detecting the first detection light and the at least a second detection light at different times, preferably alternately or in a predeterminable sequence. Not only by a predeterminable temporal sequence of the provision of the illumination beams but also by a predeterminable sequence of the detection function of the detection device or the sensors, a particularly high flexibility and adaptation to different requirements and examination methods may be achieved with the light sheet microscope according to the invention. In a simple situation, the capture of images may be realized such that the illumination beam is switched so that the first optical path is used for illumination at a first time while a first sensor takes an image and then—at a second time—a second illumination optical path is activated and, using a second sensor, an image is captured from, for example, an approximately orthogonal direction.

In a further advantageous embodiment of the light sheet microscope, an emission filter, bandpass filter or a filter for the first and/or the at least one second detection light is arranged in the optical path in front of the detection device or in front of at least one sensor. Such emission filters may be implemented in various forms, wherein, for example, a prism or a grating may be used. In this case, an emission filter, bandpass filter or a filter may be positioned in a optical path which at least one of the sensors is not associated with. In other words, the light in the optical path in which the filter is located is imaged to at least one sensor and not imaged to at least one other sensor. Such filters are usually arranged in an infinity optical path, i.e. in a optical path in which the detection light is neither focused nor divergent, but is collimated.

With regard to a structurally particularly simple embodiment of the light sheet microscope, the illumination device comprises a dichroic, a galvanometer, plane-parallel glass blocks, optical fibers or a polarization-rotating element with a polarization-dependent beam splitter for coupling the illumination beams in an illumination optical path. Depending on the application, a particularly suitable coupling technique for this application may be used.

In a further advantageous embodiment, the detection device may comprise means for merging of a first detection light caused by the first illumination beam and passing along a first detection optical path in the objective and at least one second detection light caused by the at least one second illumination beam and passing along at least one second detection optical path in the objective on a sensor. In this case, detection light from different detection optical paths is guided on one and the same sensor. In this embodiment, it is therefore not necessary to assign a separate sensor to each detection optical path. In principle, the at least one second detection light may be deflected by suitable optical means to a sensor or the first sensor, so that no further sensor is required. This deflection arrangement may be cheaper than the realization of one or more other sensors, on the one hand in terms of system costs and on the other hand in terms of a required adjustment- and calibration effort with respect to the possible other sensors or cameras. It should be noted in particular that it is usually quite complicated to match several sensors or cameras to each other, also because they usually differ in their performance from each other. The guiding or deflection of the at least one second detection light onto one or the first sensor is suitable, for example, if a detection of the detection light of different illumination beams is to take place alternately. Detection light from different detection optical paths may also be guided side by side on one and the same sensor.

With regard to particularly reliable production of high-resolution images of a specimen, the illumination device may comprise means for displacing the first light sheet and/or the at least one second light sheet for generating stacks of images from preferably parallel image planes and that an evaluation device for processing the image stacks is associated to the detection device.

In a further concrete embodiment, the first illumination beam and the at least one second illumination beam may be scanned through the specimen by means of a single common optical element along a direction perpendicular to the optical axis of the objective, wherein said optical element may preferably be used for the descanning of detection light returned via said optical element. Such an optical element may, for example, have a tilting mirror or a galvanometer. Upon descanning, the variable position of the illumination plane in the specimen may be imaged onto a stationary sensor.

Furthermore, a microscopic method with a light sheet microscope is provided according to an embodiment, characterized by the steps of: capturing images of a specimen, wherein the angle between the image planes and the optical axis is ideally the same and the angle between the image planes is ideally 90°, generating image stacks of images of ideally mutually parallel planes and merging the image stacks, for example by a multi-view deconvolution.

Figure 1:
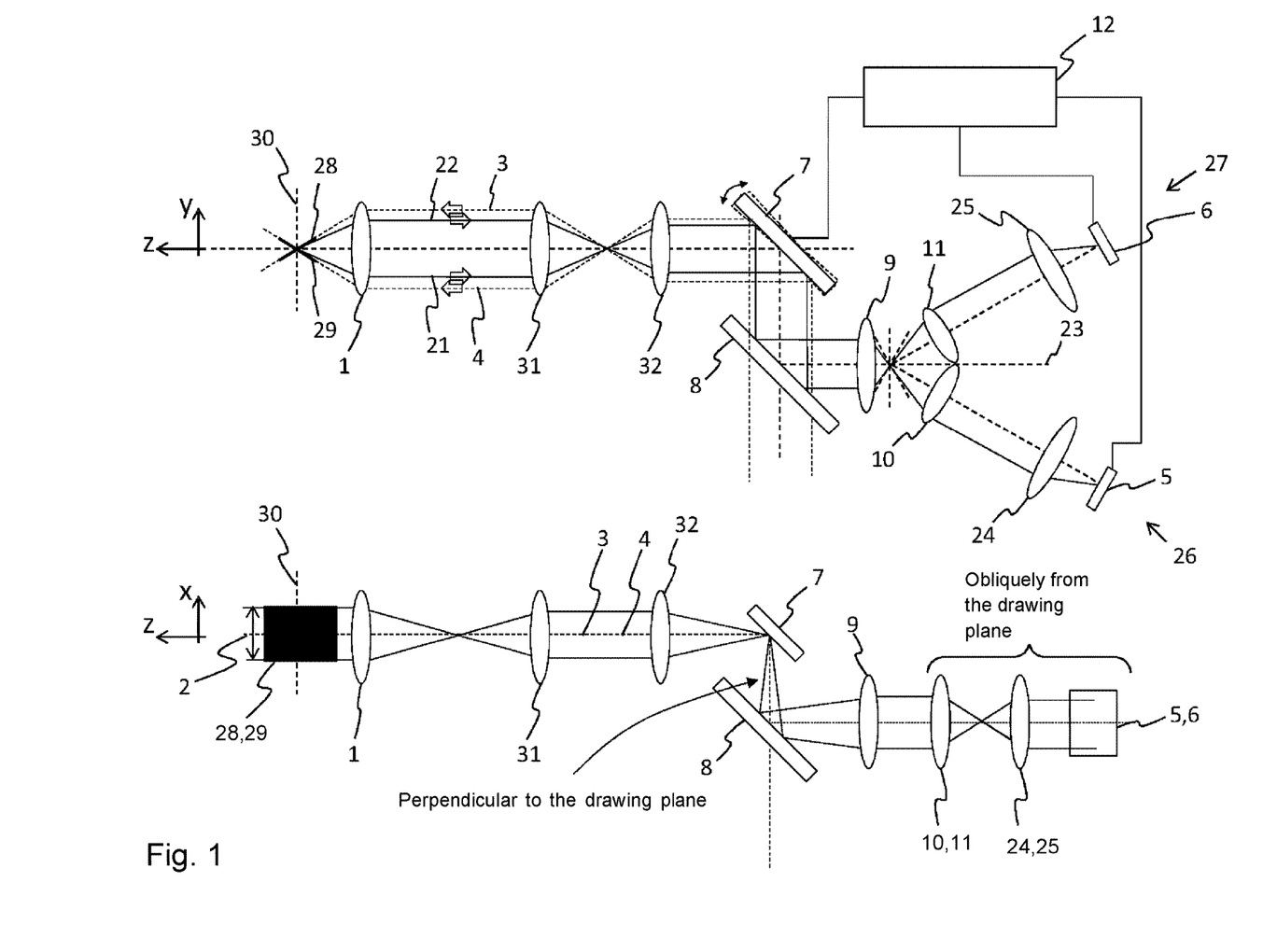
FIG. 1 shows, in a schematic representation, an optical path in a light sheet microscope according to an exemplary embodiment of the invention, the optical path being shown on the one hand in the y-z plane and on the other hand in the x-z plane.

FIG. 1 shows a schematic representation of a optical path in a light sheet microscope according to a first exemplary embodiment of the invention. The optical path is shown in the upper half of FIG. 1 in a y-z plane and in the lower half of FIG. 1 in an x-z plane. The exemplary embodiment comprises a specimen-side first objective 1 with an optical axis 2, wherein a first illumination beam 3 is generated at a time 1, which is focused to form a first light sheet inclined obliquely to the optical axis 2 of the objective 1 and guided through the objective 1 in a first image plane 28 to illuminate a specimen from a first direction. Furthermore, the illumination device is designed to provide a second illumination beam 4 at a point in time 2, wherein the second illumination beam 4 is focused in order to form a second light sheet inclined obliquely to the optical axis 2 of the objective 1 and guided through the objective 1 in a second image plane 29 for illuminating the specimen from a second direction different from the first direction.

The detection device has a first sensor 5 for the first detection beam 21 caused by the first illumination beam 3 and guided along a first detection optical path in objective 1 and a second sensor 6 for a second detection light 22 caused by second illumination beam 4 and guided along a second detection optical path in objective 1. A shift of the light sheets along the y-direction occurs by means of a galvanometer 7 to generate a stack of images consisting of mutually parallel image planes. The coupling of the illumination beams 3, 4 occurs via a dichroic 8.

Through a second objective 9, an aerial image of the first and second detection light 21 and 22 is generated. As described above, the detection light 21 caused by the first illumination beam 3 generates an aerial image in an image plane which is imaged onto the first sensor 5 by a first detection optics (comprising a third objective 10 and a tubular lens 24) perpendicular to this image plane. In addition, the second detection light 22 also generates a second aerial image in a second image plane, which is mirrored on the optical axis 23 of the objective 9. This aerial image is imaged onto a second sensor 6 by a second detection optical system (comprising a fourth objective 11 and a tubular lens 25) perpendicular to this second image plane. In summary, the aerial images are captured by detection systems and imaged without aberration on sensors 6 and 5, wherein the detection systems for the first and the second aerial image are in a "mirrored" position with respect to the optical axis of the objective 9. Although it would be alternatively possible (when not using a second detection optics) to rotate the system consisting of the third objective 10, a tubular lens 24 and the sensor 5 about the optical axis 23 of the second objective 9, but this is very complicated and error-prone due to the required precision for the dimensions and the mass of the components to be moved. The advantage of constructing a second detection system with a second sensor 6 for detecting the images from the second direction, as shown in FIG. 1, is also that images from the first and the second direction may be recorded simultaneously or within a very short period of time, which would be unthinkable in case of a mechanical rotation of the entire detection system. The coupling of illumination light may also take place via one or more dichroic mirrors between the third objectives 10, 11 and/or the tubular lenses 24, 25. In this case, no dichroic mirror between galvanometer 7 and second objective 9 is necessary.

With the embodiment shown in FIG. 1, a simple capturing of image stacks is possible, wherein, in this case, a tilting of a galvanometer 7 lying in a rear focal plane of the specimen-side detection objective 1 takes place. Alternatively, the displacement of the aerial image-generating objective 9 along its optical axis 23, for example by means of a piezo actuator (SPIM according to Dunsby), may enable the generation and capturing of image stacks. Further alternatively, the object may simply be displaced relative to the objective 1 for generating and picking up image stacks, preferably along the Y axis. The advantages of the first two variants are that the object does not have to be moved. The last variant is optically simpler and cheaper to implement.

FIG. 1 further shows a control unit 12, which may be formed for example by a computing device, a computer or the like, wherein the control unit 12 may be designed to take over a plurality of tasks. This may be, for example, the control of the actuators for the relative offset of the illumination/detection plane relative to the object, by means of the three particularly advantageous methods described above. Furthermore, the control unit 12 may perform, alternatively or additionally, for example, the reading and processing of the images of the sensors 5, 6 or the sensor elements, see FIG. 3c. Alternatively or additionally, the control unit 12 may perform the processing of the images to a 3D image stack, such as a stack of images according to FIG. 5, for example by means of multi-view deconvolution.

Figure 1A:
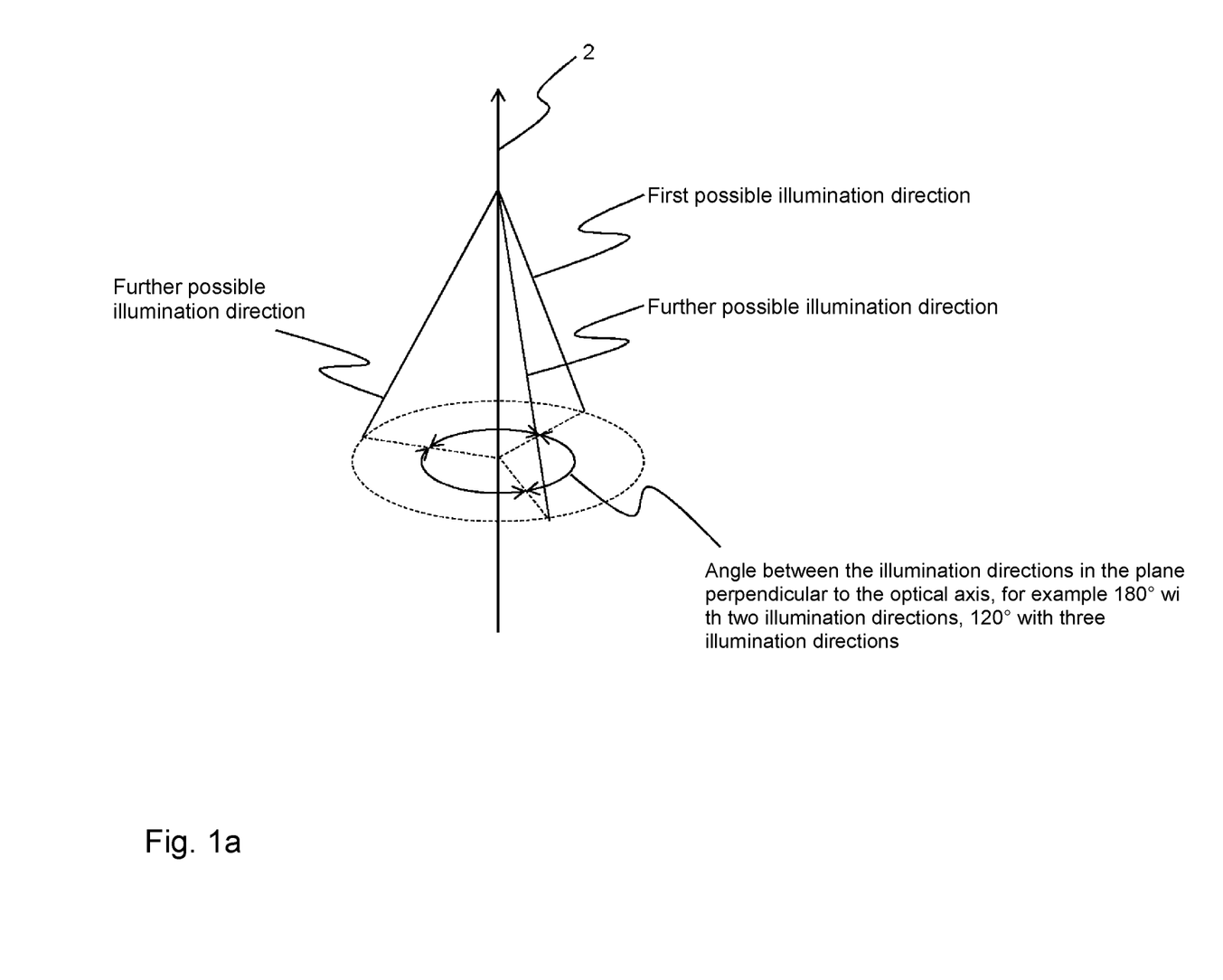
FIG. 1a shows a schematic representation of an embodiment with three alignment units.

In principle, a light sheet microscope according to the invention is also conceivable with more than two such alignment units 26 and 27, which, according to FIG. 1, are provided with elements 5, 24 and 10 or 6, 25 and 11. With three units, these could then be arranged so that the optical axes are each at angles of 120° to each other, wherein respective focal planes may be parallel to the surfaces of a tetrahedron, see FIG. 1a. In this case, a galvanometer or galvanometer mirror could be designed as a preferably 2-axis gimbal galvanometer in order to be able to operate the objectives oriented in different directions. Another alternative consists of four pairs of opposite objectives. Their advantage is that in each case two opposite directions may be operated simultaneously. By more than two opposing objectives, however, the resolution of the system may only slightly increase, since the main advantage of fusing or merging images from multiple directions consists in processing two image stacks preferably perpendicular to each other, so that instead of the—worse—axial resolution in one image stack the—better—lateral resolution of the other image stack may be used. The main advantage of illumination and detection from more than two directions is the possibility of reducing shadowing effects that may result from scattering and/or absorbing parts in the specimen.

A method for capturing images may be configured such that a first illumination beam 3 is used at a first time to illuminate the specimen and a sensor 5 captures/picks up a corresponding image. Thereafter, a second illumination optical path is activated with a second illumination beam 4, wherein a second sensor 6 captures an image from an approximately orthogonal direction at a second point in time.

Such images may also be captured simultaneously or during the same period of time, when different dyes are excited in the specimen by light from illumination beams 3 and 4 having different wavelengths. It is advantageous if the emission spectra of the dyes or fluorophores overlap each other as little as possible and with the excitation wavelengths of the illumination beams 3 and 4. In a further advantageous manner, emission filters, bandpass filters or filters may be positioned in front of the sensors 5 and 6, which filters cut out regions from the regions of the spectra of the fluorophores or dyes in which neither the other fluorophore emits light nor the light used to excite it is present. In these cases, it is possible to measure simultaneously from two directions.

Essentially, there are two options for acquiring 3D volumes. For the imaging of a dye, images of mutually parallel planes may be captured from one direction successively by tilting the galvanometer 7. Subsequently, the illumination is switched and a stack of images is captured with the second sensor 6, from the other direction. This may happen either on the "return path" of the galvanometer, sending a zigzag control signal to the galvanometer, or in the same direction, sending a sawtooth signal to the galvanometer. For the return to the starting point, a pause—a few milliseconds—may be provided in the image capturing. Alternatively, the illumination may be switched so fast that for each angular position of the galvanometer 7 images of the specimen are taken from two directions. The movement of the galvanometer 7 may be carried out stepwise, but advantageously continuously at a speed which avoids blurring of the image due to the relative movement of the imaged plane relative to the specimen during the exposure time, i.e. the motion contribution is significantly less than the effective depth of field of detection. The decision about whether the first or the second mode is preferred, is essentially based on how fast the switching or switch-over of the illumination may occur. If fast and low-wear switches are used, the second mode may be used advantageously. Otherwise, the first mode represents a simple alternative.

According to the embodiment of FIG. 1, the illumination beams 3 and 4 are coupled via a dichroic 8 between the galvanometer 7 and the second objective 9. In contrast to the realization and representation according to the embodiment in FIG. 1, however, it is particularly advantageous to reflect the illumination beams 3 and 4 via the dichroic 8 in the optical path instead of transmitting the same. Correspondingly, the image or detection light would then be transmitted and not reflected as shown in FIG. 1.

For switching the illumination, a further actuator may be necessary, which may generate the necessary parallel beam offset of the illumination beams 3 and 4. It is only required that an illumination beam may be provided alternately at two positions. Therefore, an embodiment with a continuously working component such as a galvanometer or a wobble plate does not appear to be necessary, but would be able to take directly into account a flexible adjustment of the position, in particular of tilt, of the light sheet as a function of the refractive index of the specimen.

Figure 2:
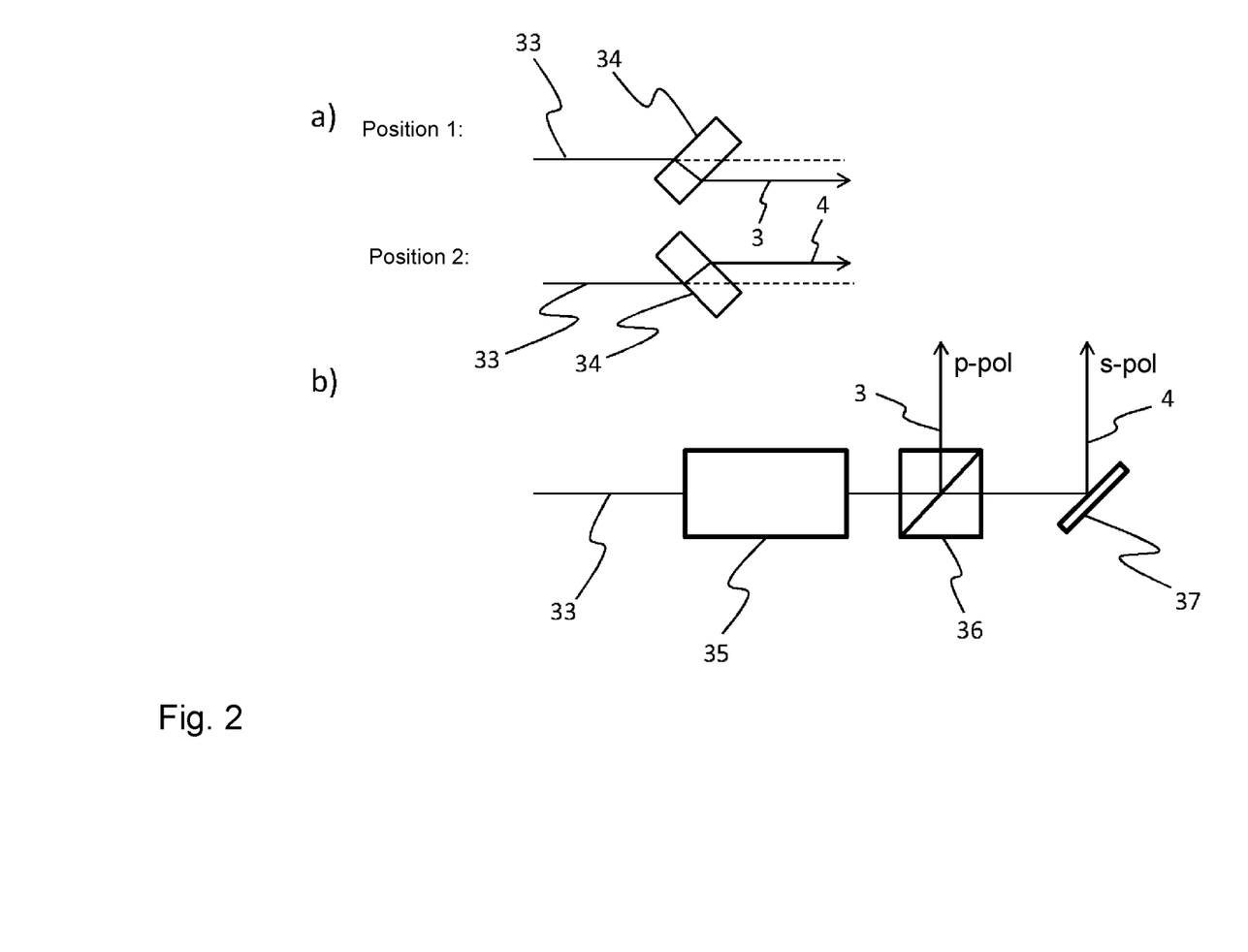
FIG. 2 shows a schematic representation of two ways of coupling two illumination beams.

According to FIG. 2, a further exemplary embodiment of a device for providing two illumination beams 3, 4 at two different positions is shown at the upper position a). In this case, one or more plane-parallel glass blocks 34 may be introduced into the optical path 33 of the light source, which blocks deflect the beam respectively into one or the other optical path in order to generate the two illumination beams 3, 4. Simply turning a glass block 34 may provide the switching operation.

Alternatively, FIG. 2 shows at b) a combination of a fast polarization-rotating element 35 such as an EOM (electro-optical modulator) and a polarization-dependent beam splitter 36 in the optical path 33 of the light source. Depending on the polarization of the light beam, reflection takes place through the polarization-dependent beam splitter at one or the other position. In order to align the two illumination beams 3, 4 thus generated in parallel for improving their further use, a downstream mirror 37 may optionally be used, for example.

Alternatively, two optical fibers could be placed in a suitable position, the light between the fibers being switchable with a fast switch.

Alternatively, for example, if no beam splitter can or should be introduced between the second objective 9 and the galvanometer 7, dichroics may also be used in the alignment units 26 and 27.

Figure 3A:
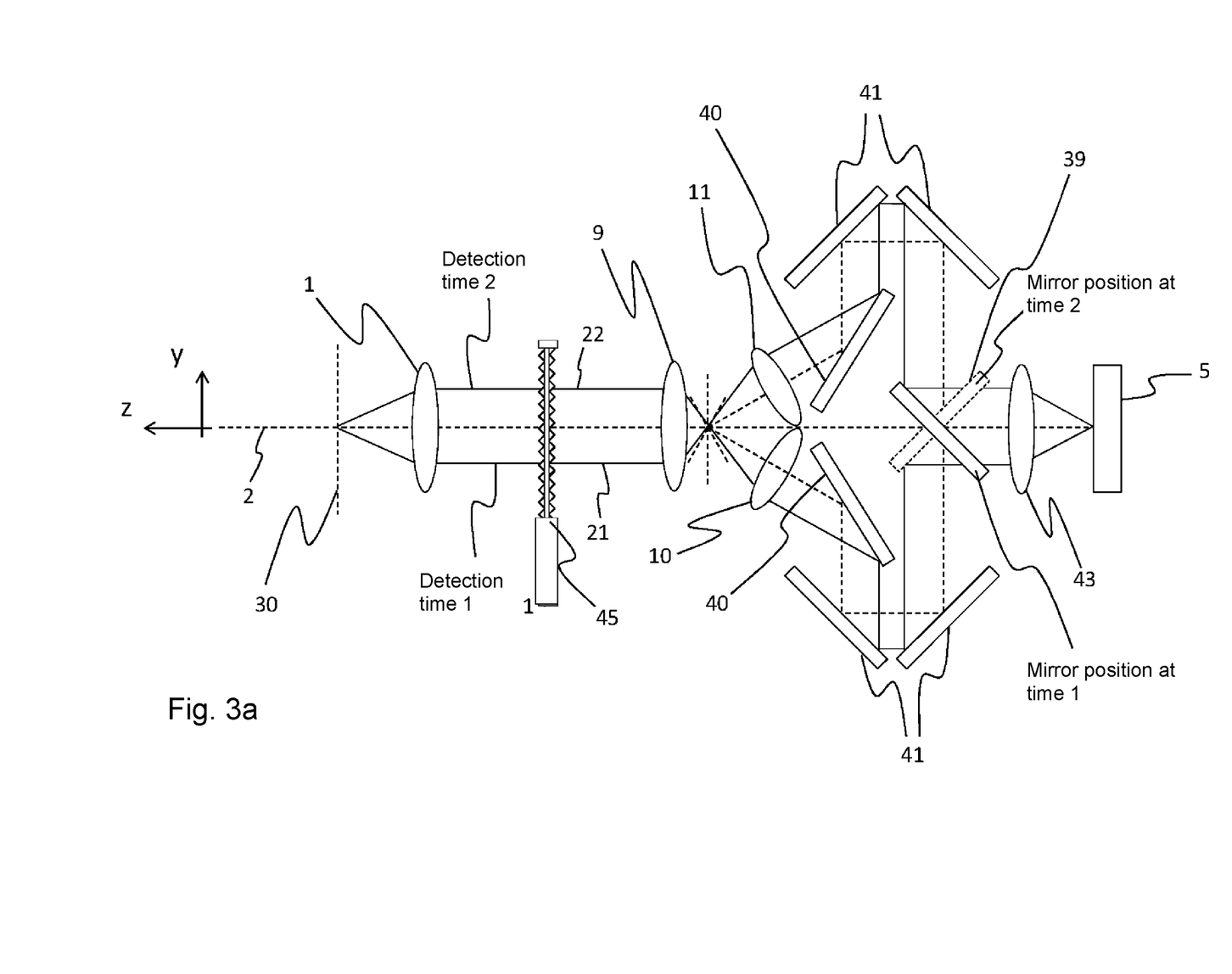
FIGS. 3a, 3b and 3c show schematic representations of an optical path in a light sheet microscope according to further embodiments.

FIGS. 3a, b and c show further embodiments of a optical path in a light sheet microscope, wherein two different detection optical paths are combined in order to be able to image them on a single sensor 5. For elements of the figures, which are designated by the same reference numerals as corresponding elements in FIG. 1, reference is made to the description of the figures in FIG. 1. The tubular lens 43 may also be configured in duplicate in the two optical paths. Instead of the mirrors 40, 41, 42 shown here, it is also possible, for example, to use dichroic cubes with long-pass or short-pass filters, if detection is simultaneously performed with two colors.

For changing the guidance of the detection optical paths to the sensor 5, a tilting mirror 39 and further mirrors 40, 41 and a tubular lens 43 are used in the exemplary embodiment in FIG. 3a. The tilting mirror may assume two orientations (mirror positions), which are defined by the fact that in the first mirror position (at a time 1) the first detection light 21 reaches the sensor 5 via a first detection optical path and in the case of the second mirror position (at a time 2) the second detection light 22 reaches the sensor 5 via a second detection optical path. The points in time must be selected so that they suitably correspond to the times of illumination by means of the illumination beams 3, 4, i.e. they are defined so that detection light generated by the illumination beam 3 reaches the sensor 5 with one of the two mirror positions of the tilting mirror 39 and generates detection light through the illumination beam 4 at the other mirror position.

Figure 3B:
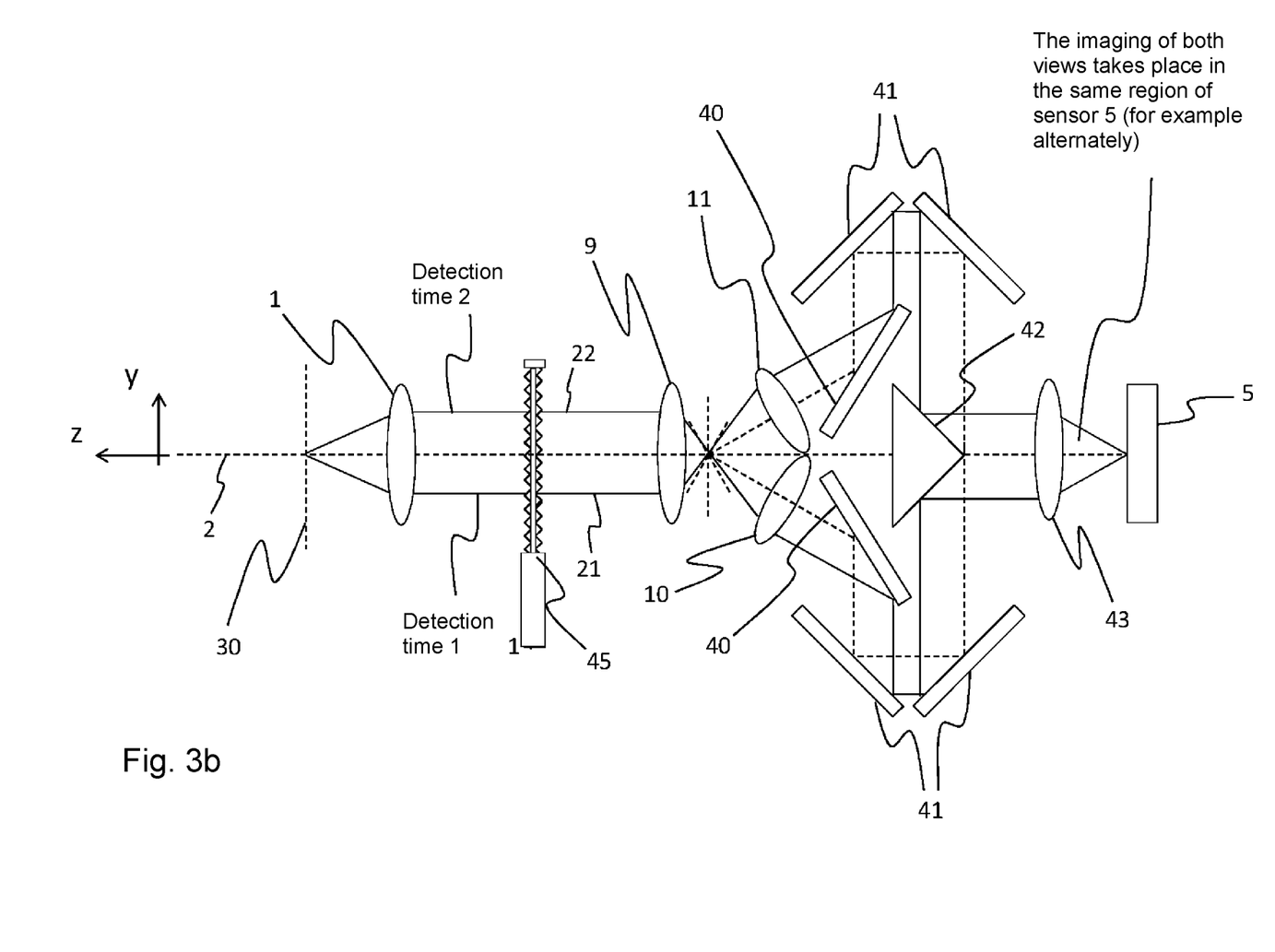

By contrast, in the exemplary embodiment shown in FIG. 3b, a fixed mirror system (formed by the mirrors 40, 41, 42) is used in a simplified manner. Compared to the exemplary embodiment from FIG. 3a, this has the disadvantage that it may potentially lead to disturbing artifacts in the detection or to a lower image quality, partly because of the non-ideal imaging, since both detection optical paths are always open.

The imaging (via mirrors 39, 40, 41, 42 and objective 43) takes place in the case of the exemplary embodiments shown in FIGS. 3a and 3b at two detection times, for example alternately, on the same region of the sensor 5. However, the optical paths for the two views may also be designed so that the images are offset next to each other on the sensor 5. A corresponding embodiment is shown in FIG. 3c.

Figure 3C:
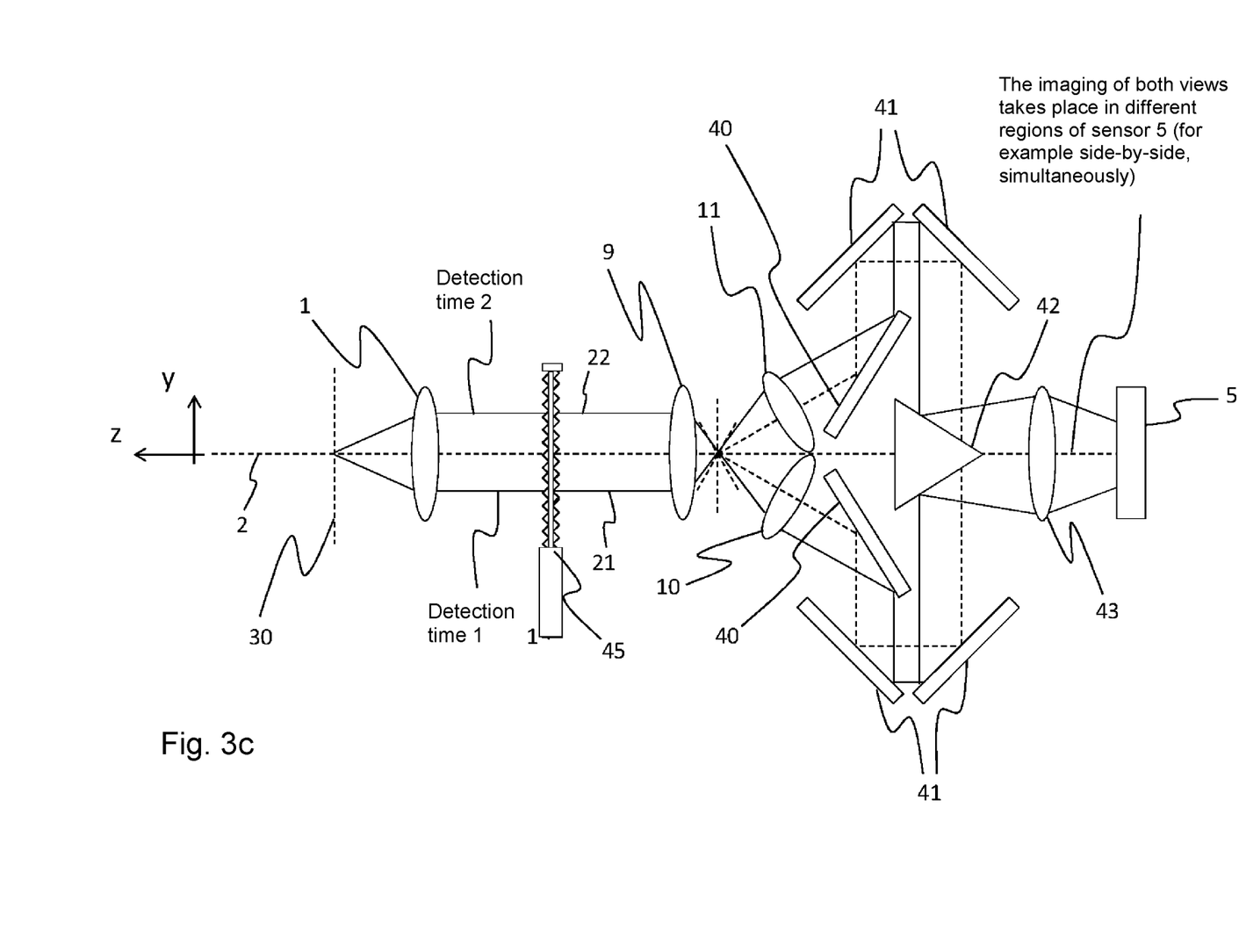

The representation of the detection optical path between specimen-side objective 1 and objective 9 is shown in a simplified manner in FIGS. 3a, 3b, 3c without galvanometer 7 and objective 31. The scanning actuator (galvanometer mirror) and/or any number of telecentric optical imaging systems may be inserted at designated location 45. For the imaging of volumes, an optical system as shown in FIG. 1 may be used or the objective 9 may be mounted in a mechanically slidable manner along its optical axis.

Figure 4:
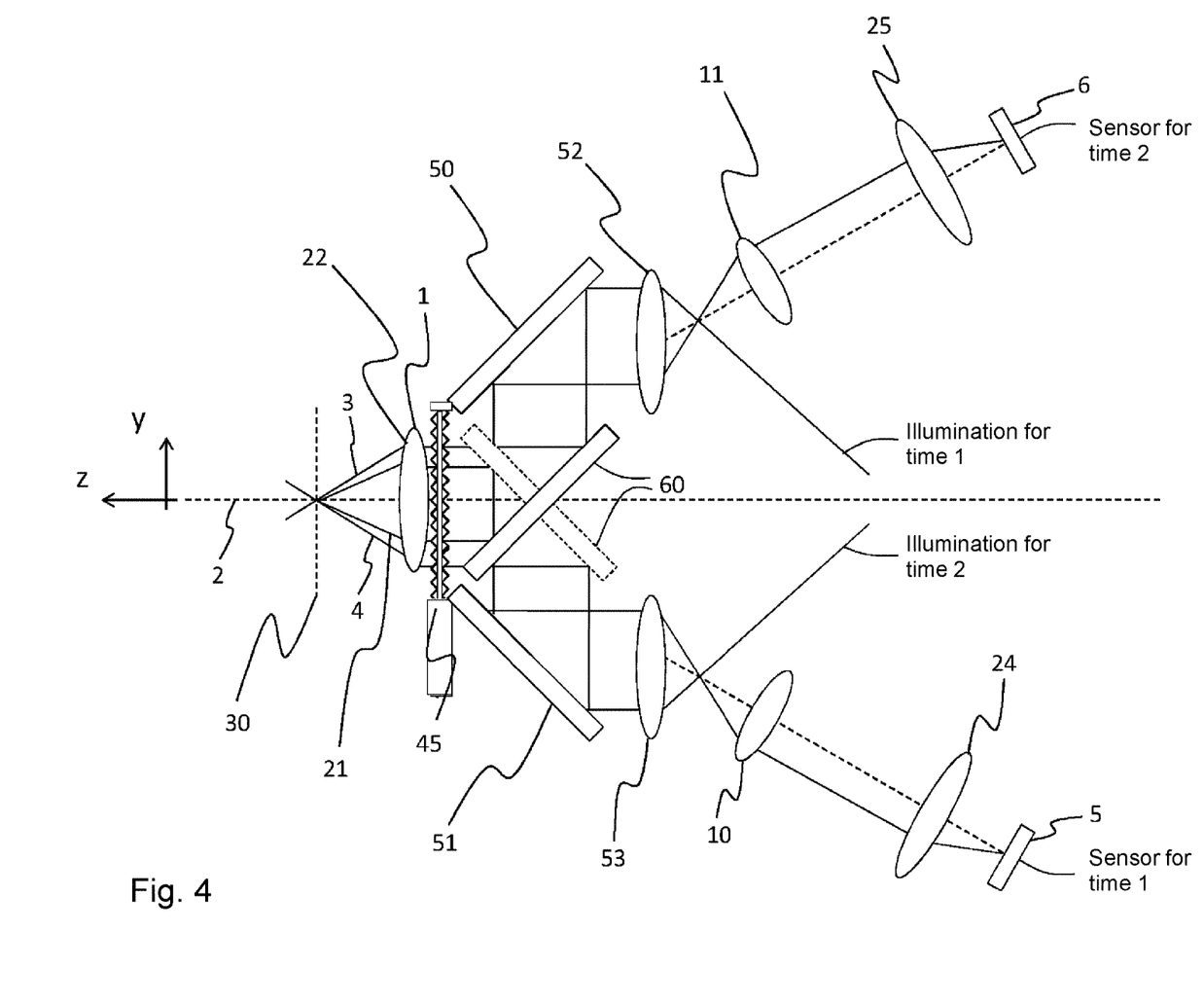
FIG. 4 shows a schematic representation of an optical path in a light sheet microscope according to a further exemplary embodiment.

FIG. 4 shows a further exemplary embodiment of a optical path in a light sheet microscope, this embodiment being designed to avoid a steric collision in case of provision of third objectives 10, 11 with a high numerical aperture. The illustration is simplified, in a way similar to FIGS. 3a, 3b, 3c, without a galvanometer. Similar to FIG. 3a, a switchable mirror is used, although it is used to split the detection path even before an objective producing the aerial image (objective 9 in the other exemplary embodiments). The mirrors 50, 51 serve in this embodiment only for compacting the structure. The objectives 52 and 53 take over the function of the objective 9 from the previous embodiments. As in the previous examples, the scanning actuator (galvanometer mirror) and/or any number of telecentric optical imaging systems may be inserted at the designated location 45, for example. Also in this embodiment, elements designated by the same reference numerals as in FIG. 1 correspond to the elements shown in FIG. 1.

Figure 5:
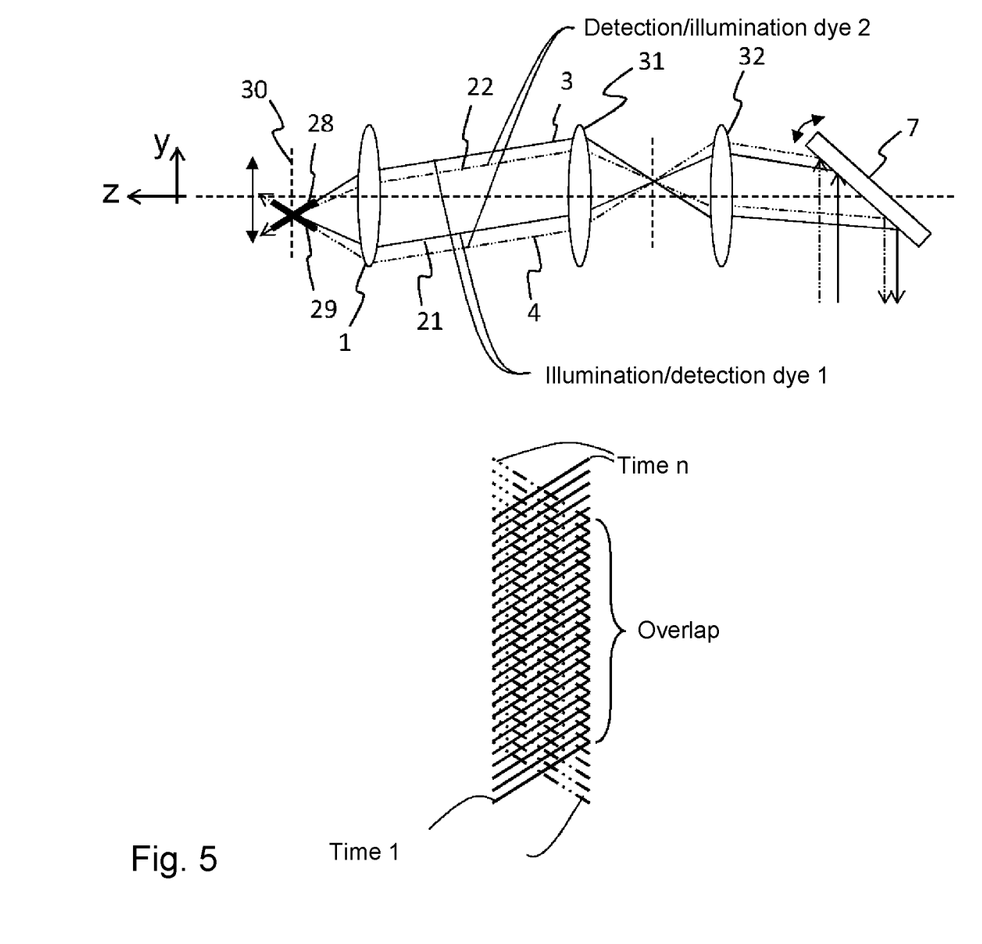
FIG. 5 shows a schematic representation of an image taken simultaneously with emissions at different wavelengths.

FIG. 5 shows a schematic illustration of a scanning movement in which different dyes 1 and 2 having different wavelengths are excited to emit detection light with likewise different wavelengths. In this case, both illumination beams 3, 4 are always directed simultaneously to the specimen at successive times, whereby the different dyes 1 and 2 contained in the specimen are excited at the same time to emit detection light 21, 22. A detection light 21, 22 of both dyes generated and captures in this way (for example, by means of a construction as shown in FIG. 1) may be progressively processed into a picture stack from time 1 to time n, as shown in the lower part of FIG. 5. Again, elements of the figure designated by the same reference numerals as in FIG. 1 correspond to the elements shown in FIG. 1.

Figure 6:
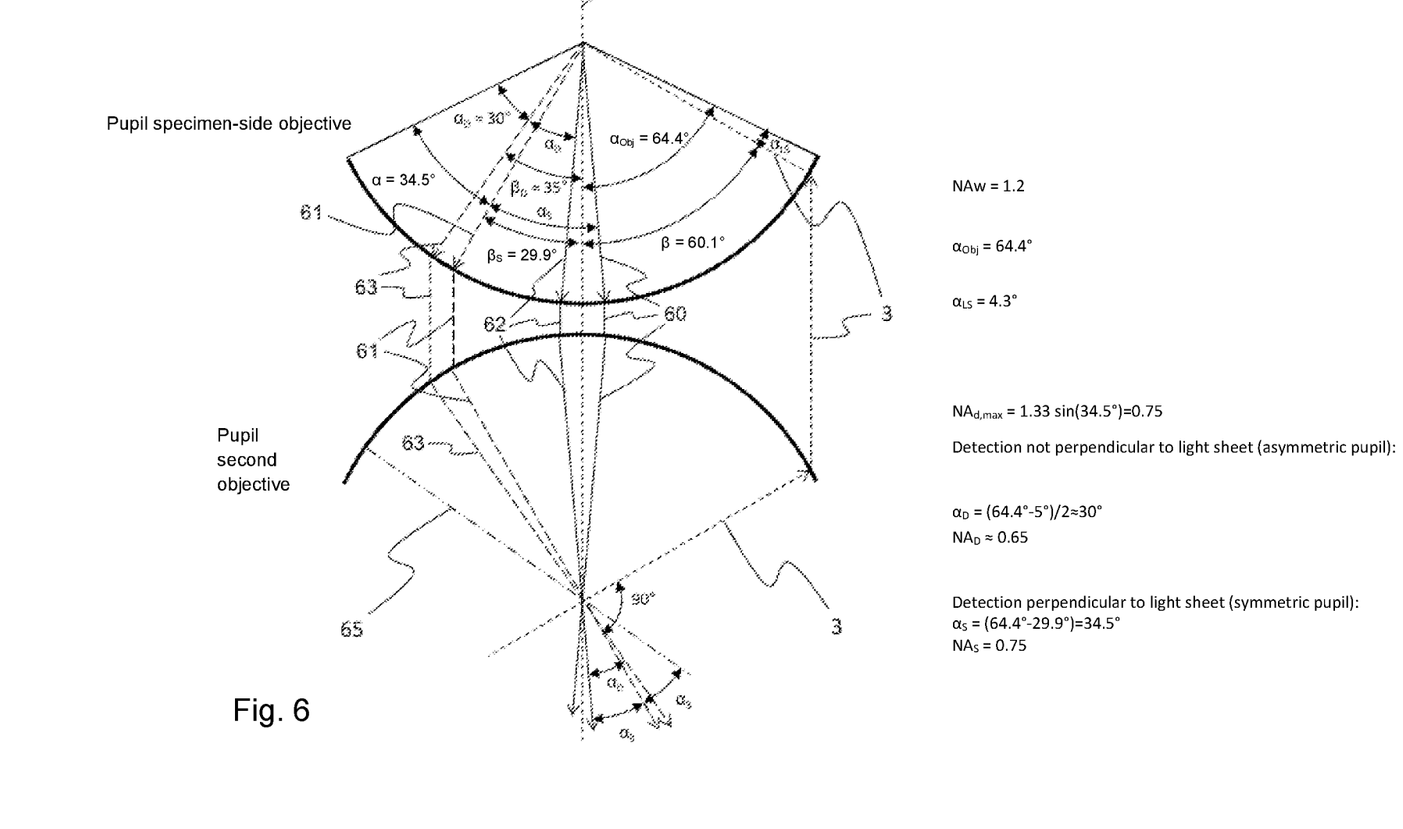
FIGS. 6 to 8 show schematic representations of optical paths, illumination angles and apertures for illumination objectives with NA=1.2, 1.1 and 1.0, respectively.
Figure 7:
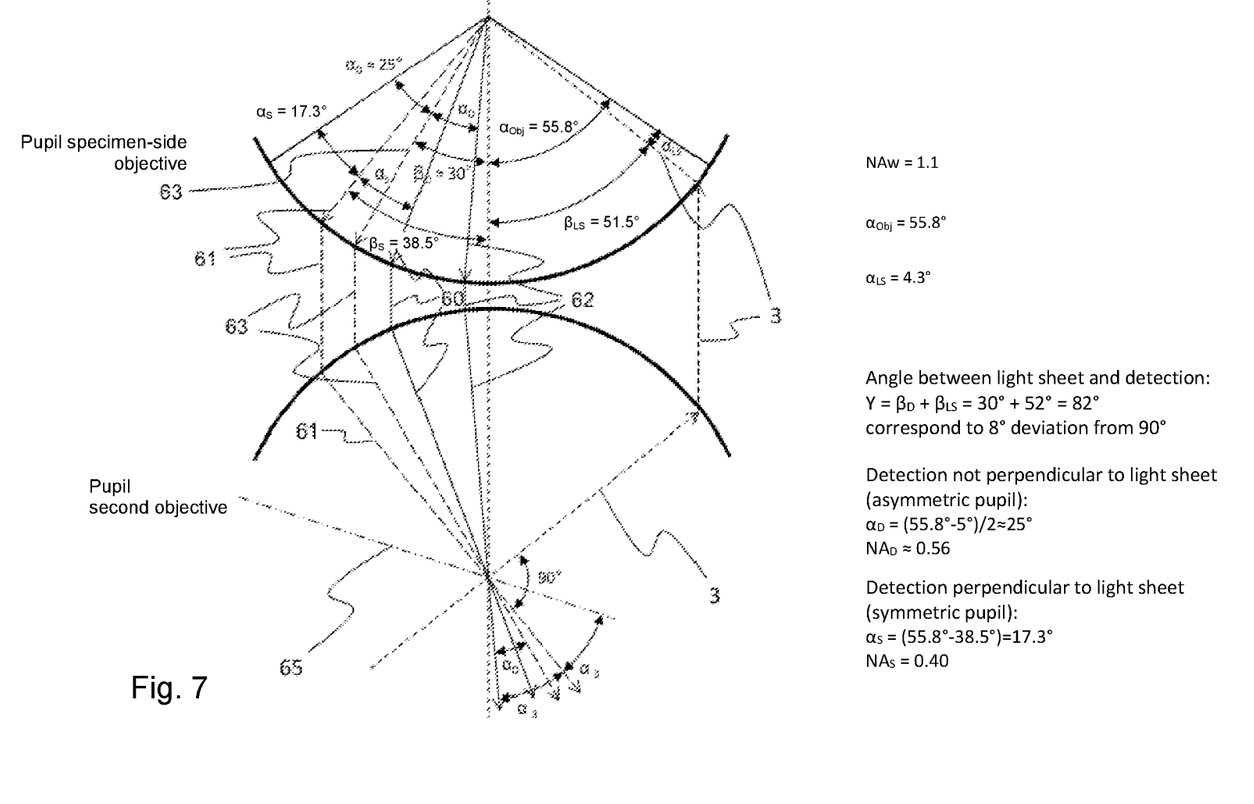
Figure 8:
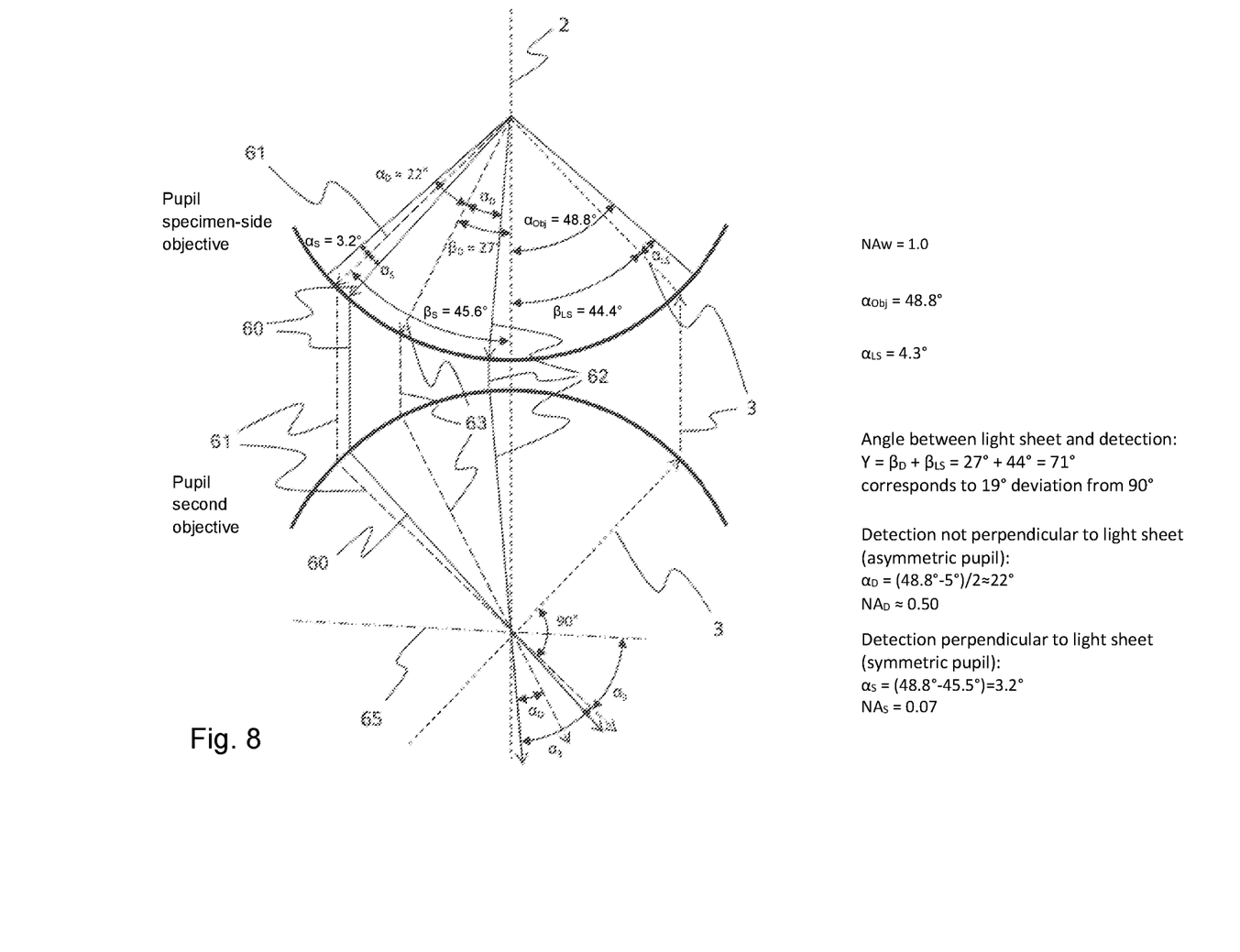

FIGS. 6 to 8 show the optical paths, illumination angles and apertures for illumination objectives with a numerical aperture $NA_w=1.2$ (FIG. 6), 1.1 (FIG. 7) and 1.0 (FIG. 8) in water (refractive index n=1.33), wherein two exemplary variants are provided for the optical path, one in case of detection perpendicular to the light sheet, and one in case of a non-perpendicular detection. In the drawings, the angles relevant to the following considerations are plotted, wherein variable names including the character "α" refer to half the opening angle, while variable names including the character "β" denote angles with respect to the optical axis 2. Indices "S" refer to angles in case of perpendicular detection, and "D" to angles occurring in case of non-perpendicular detection.

Typically, the light sheet generated by the illumination beam 3 is tilted against the optical axis 2 by an angle $\beta_{LS}$. The angle $a_{LS}$ corresponds to half the opening angle of the illumination beam 3 at a numerical aperture $NA=n \sin(a_{LS})$. As described above, two optical paths 60, 61 for perpendicular and 62, 63 for non-perpendicular detection are drawn in each case, wherein the main beams 61 and 63 are shown in dashed lines and each peripheral beam 60, 62 is shown. With 60, 61, an optical path is shown, which guarantees a detection perpendicular to the illumination and in which the peripheral rays 60 are arranged symmetrically about the main beam 61. The main beam 61 is then tilted by the angle $\beta_S=90°-\beta_{LS}$ against the optical axis. The symmetrical (sagittal) aperture for the perpendicular case then results from $NA_S=n \sin(\alpha_s)$ with $\alpha_S=\alpha_{obj}-\beta_s$, where $\alpha_{obj}$ is the half-aperture angle of the specimen-side objective.

TABLE 1

| Symmetric pupil | NAw = 1.2 | NAw = 1.1 | NAw = 1.0 |
|---|---|---|---|
| $\alpha_{obj}$ | 64.4° | 55.8° | 48.8° |
| $\beta_{LS}$ | 60.1° | 51.5° | 44.4° |
| $\beta_s$ | 29.9° | 38.5° | 45.6° |
| $\alpha_s$ | 34.5° | 17.3° | 3.2° |
| $NA_s$ | 0.75 | 0.4 | 0.07 |

As may be seen in FIG. 6, with a high aperture of the objective of $NA_w=1.2$, detection may be performed at a high numerical aperture of up to $NA_{d,max}=0.75$. However, in this case, no two objectives 10, 11 may be mounted on the opposite side, since the two objectives would collide. In FIGS. 7 and 8, i.e. in the case of objectives with $NA_w=1.1$ and $NA_w=1.0$, there are no collision problems, but a possible aperture is given away by the symmetrical use of the objective and the vertical alignment on the light sheet. In FIG. 8 it may be seen that a non-practical detection aperture of 0.07 remains.

Therefore, an alternative optical path 62, 63 is shown, which on the one hand makes maximum use of the detection aperture and, on the other hand, additionally frees 5° solid angle to the optical axis in order to mount two objectives (thus avoiding the steric collision discussed above). From this follows $\beta_D = \alpha_D - 5°$. The values are summarized in Table 2. The maximum numerical aperture that may be used to avoid collisions of the two third and fourth objectives 10, 11 used to detect the aerial images may be larger for $NA_w = 1.0$ and $NA_w = 1.1$ than would be necessary for the transmission of optical information. In other words, the partial aperture used for detection by the specimen-side objective 1 may be smaller than that of the objectives 10, 11, without collision/overlap of the objectives. It should be noted in this case that the asymmetrical use of the pupil leads to an asymmetrical numerical aperture or use of the aperture and therefore the resolution is also asymmetric. The third and fourth objectives 10, 11 are tilted by the angle $y = \beta_D + \beta_{Ls}$ against the plane illuminated by the light sheet. While the third and fourth objective 10, 11, maintain the solid angle $2_{\alpha 3}$ (in the figures, this corresponds to the angle between the peripheral beam 62 and the dashed line 65), the angle range $2_{\alpha D}$ is effectively used. Here, half the aperture angle $\alpha_3$ of these objectives is given by the tilt angle between the optical axis 2 and the main beam 61 less the above-mentioned angle to avoid the steric collision, i.e. in this example 5°. While for a NA of the specimen-side objective 1 of 1.2, the third and fourth objective 10, 11 thus limit the effective detection aperture, this is not the case for smaller values of the aperture from the specimen-side objective 1 of 1.1 or 1.0.

TABLE 2

| Asymmetric pupil | NAw = 1.2 | NAw = 1.1 | NAw = 1.0 |
| --- | --- | --- | --- |
| $\alpha_{obj}$ | 64.4° | 55.8° | 48.8° |
| $\beta_{LS}$ | 60.1° | 51.5° | 44.4° |
| $\beta_D$ | 35° | 30° | 27° |
| $\alpha_D$ | 30° | 25° | 22° |
| $NA_D$ | 0.65 | 0.56 | 0.50 |

According to FIG. 6, the optical path 60, 61 ensures the detection perpendicular to the excitation. The alternative optical path 62, 63 is dual-view compatible, i.e. it is possible to use two objectives with a half aperture angle $\alpha_D$ and $\beta_D$ tilt with respect to the optical axis in order to pick up mutually tilted aerial images.

With regard to further advantageous embodiments of the light sheet microscope according to the invention and the microscopic method according to the invention with a light sheet microscope, to avoid repetitions, reference is made to the general part of the description and to the appended claims.

Finally, it should be expressly pointed out that the embodiments described above are only for the purpose of discussion of the claimed teaching, but do not limit these to the exemplary embodiments.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A light sheet microscope comprising:
   a specimen-side objective having an illumination device configured to simultaneously provide a first illumination beam which is focused for forming a first light sheet for illuminating a specimen from a first direction and at least one second illumination beam which is focused for forming at least one second light sheet for illuminating the specimen from at least one second direction that differs from the first direction, the light sheets being inclined obliquely in relation to an optical axis of the objective and being guided through the objective; and
   a detector configured to simultaneously detect a first detection light caused by the first illumination beam and passing through the objective along a first detection beam path and at least one second detection light caused by the at least one second illumination beam and passing through the objective along at least one second detection beam path.

2. The light sheet microscope according to claim 1, wherein the first direction of the first illumination beam and the at least one second direction of the at least one second illumination beam are perpendicular to each other or approximately perpendicular to each other, or wherein the illumination beams are directed in a peripheral region of the pupil or a rear focal plane of the specimen-side objective.

3. The light sheet microscope according to claim 1, wherein the detector comprises a first sensor configured to detect the first detection light caused by the first illumination beam and passing along the first detection optical path in the objective and at least one second sensor configured to detect the at least one second detection light caused by the at least one second illumination beam and passing along the at least one second detection optical path in the objective.

4. The light sheet microscope according to claim 1, wherein an emission filter, bandpass filter or a filter for the first and/or the at least one second detection light is arranged in the optical path in front of the detector or in front of at least one sensor.

5. The light sheet microscope according to claim 1, wherein the illumination device comprises a dichroic, a galvanometer, plane-parallel glass blocks, optical fibers or a polarization-rotating element with a polarization-dependent beam splitter configured to couple the illumination beams in an illumination optical path.

6. The light sheet microscope according to claim 1, wherein the detector is configured to merge the first detection light caused by the first illumination beam and passing along the first detection optical path in the objective and the at least one second detection light caused by the at least one second illumination beam and passing along the at least one second detection optical path in the objective on a sensor.

7. The light sheet microscope according to claim 1, wherein the illumination device is configured to displace the first light sheet and/or the at least one second light sheet such that stacks of images are generated from image planes, and wherein an evaluation device for processing the image stacks is associated to the detector.

8. The light sheet microscope according to claim 1, wherein the first illumination beam and the at least one second illumination beam are scannable through the specimen by a single common optical element along a direction perpendicular to the optical axis of the objective, and wherein the optical element is useable for the descanning of detection light returned via the optical element.

9. The light sheet microscope according to claim 1, wherein the first direction of the first illumination beam and the at least one second direction of the at least one second illumination beam are perpendicular to each other or approximately perpendicular to each other.

10. A microscopic method with a light sheet microscope, the microscopic method comprising:
    simultaneously providing, by an illumination device, a first illumination beam which is focused to form a first light sheet that illuminates a specimen from a first direction and at least one second illumination beam which is focused to form at least one second light sheet that illuminates the specimen from at least one second direction that differs from the first direction, the light sheets being inclined obliquely in relation to an optical axis of a specimen-side objective and being guided through the objective; and
    simultaneously detecting, by a detector, a first detection light caused by the first illumination beam and passing through the objective along a first detection beam path and at least one second detection light caused by the at least one second illumination beam and passing through the objective along at least one second detection beam path.

11. The microscopic method according to claim 10, the method further comprising:
    capturing images of the specimen, wherein an angle between image planes and an optical axis of the objective of the light sheet microscope is the same and an angle between the image planes is 90°, the image planes being illuminated simultaneously by the first illumination beam and the at least one second illumination beam;
    generating image stacks of images of mutually parallel planes; and
    merging the image stacks.

12. The microscopic method according to claim 11, wherein the image stacks are merged by a multi-view deconvolution.

13. A microscopic method with a light sheet microscope, the microscopic method comprising:
    providing, by an illumination device, a first illumination beam which is focused to form a first light sheet that illuminates a specimen from a first direction and at least one second illumination beam which is focused to form at least one second light sheet that illuminates the specimen from at least one second direction that differs from and is tilted relative to the first direction, the light sheets being inclined obliquely in relation to an optical axis of a specimen-side objective and being guided through the objective; and
    detecting, by a detector, a first detection light caused by the first illumination beam and passing through the objective along a first detection beam path and at least one second detection light caused by the at least one second illumination beam and passing through the objective along at least one second detection beam path.

14. The microscopic method according to claim 13, wherein the first direction of the first illumination beam and the at least one second direction of the at least one second illumination beam are perpendicular to each other or approximately perpendicular to each other.

15. The microscopic method according to claim 13, wherein the first illumination beam and the at least one second illumination beam extend through the objective on opposite sides of the optical axis.

16. The microscopic method according to claim 15, wherein the first detection beam path and the at least one second detection beam path extend through the objective on opposite sides of the optical axis.

17. The microscopic method according to claim 13, wherein the first direction and the at least one second direction extend through the sample to be illuminated from opposite sides of the optical axis of the objective.

18. The microscopic method according to claim 13, wherein the first detection light is imaged onto a first sensor using first detection optics and the at least one second detection light is imaged onto a second sensor using at least one second detection optics.

19. The microscopic method according to claim 18, wherein the first detection optics includes a lens that is tilted relative to a lens of the at least one second detection optics.

20. The microscopic method according to claim 13, wherein the first illumination beam and the at least one second illumination beam are simultaneously provided, and wherein the first detection light and the at least one second detection light are simultaneously detected.

* * * * *